United States Patent
Wang

(10) Patent No.: US 6,774,976 B2
(45) Date of Patent: Aug. 10, 2004

(54) METHOD OF FABRICATING FERROELECTRIC LIQUID CRYSTAL DISPLAY

(75) Inventor: Jong-min Wang, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 44 days.

(21) Appl. No.: 10/146,906

(22) Filed: May 17, 2002

(65) Prior Publication Data

US 2002/0171802 A1 Nov. 21, 2002

(30) Foreign Application Priority Data

May 18, 2001 (KR) .......................................... 2001-27272

(51) Int. Cl.[7] .............................................. G02F 1/13
(52) U.S. Cl. ...................................................... 349/172
(58) Field of Search ................................ 349/171–172, 349/184

(56) References Cited

U.S. PATENT DOCUMENTS 5,897,189 A * 4/1999 Sako et al. .................. 349/171

FOREIGN PATENT DOCUMENTS

| JP | 63-194230 | 8/1988 |
|---|---|---|
| JP | 01-289914 | 11/1989 |
| JP | 09-311354 | 12/1997 |

* cited by examiner

*Primary Examiner*—Toan Ton
(74) *Attorney, Agent, or Firm*—Sughrue Mion, PLLC

(57) ABSTRACT

A method of fabricating a ferroelectric liquid crystal display (FLCD), including: forming a lower structure and an upper structure, each having a substrate, an electrode layer, and an alignment film which are sequentially formed; forming a cell between the lower and upper structures; bonding the lower and upper structures together; injecting ferroelectric liquid crystal into the cell and then sealing the cell; and applying an AC potential of a desired frequency to the electrode layers, while dropping a temperature of the ferroelectric liquid crystal, so that a phase the ferroelectric liquid crystal is transformed corresponding to a bookshelf structure. In the FLCD, it is possible to perform AC driving of the liquid crystal layer having the micro-domain of the bookshelf structure and to have a wider visual angle and a clear white and black state.

4 Claims, 20 Drawing Sheets

↑ RUBBING DIRECTION

V = 0 volt, T= 40°C

Nematic, T = 70°C

V = +5 volt, T= 40°C

V = -5 volt, T= 40°C

1 Hz, V = 5 volt

100 Hz, V = 5 volt

200 Hz, V = 5 volt

300 Hz, V = 5 volt

400 Hz, V = 5 volt

500 Hz, V = 5 volt

3 V, 400 Hz

5 V. 400 Hz

10 V, 400 Hz

20 V. 400Hz

METHOD OF FABRICATING FERROELECTRIC LIQUID CRYSTAL DISPLAY

BACKGROUND OF THE INVENTION

1. Field of the Invention

The present invention relates to a method of fabricating a ferroelectric liquid crystal display, and more particularly, to a method of fabricating a ferroelectric liquid crystal display having a micro-domain, which is adapted to have a bookshelf structure when crystallizing a ferroelectric liquid crystal, thereby increasing resolution.

The present invention is based on Korean Patent Application No. 2001-27272, which is incorporated herein by reference.

2. Description of the Related Art

A liquid crystal display is a flat type display, which is widely used for portable devices. Due to rapid development of display technology, the liquid crystal display is rapidly replacing a conventional CRT (cathode ray tube) display.

There are various kinds of liquid crystal materials that can be used in the liquid crystal display.

One type of liquid crystal display that is widely used is a TN (twisted nematic) liquid crystal display. The TN liquid crystal of this display utilizes the interaction between the dielectric anisotropy of liquid crystal molecules and an electric field, causing several drawbacks including an inefficient display of moving pictures due to a slow reaction time of a few tens of milliseconds (ms), and a narrow visual angle. Also, since cross-talk occurs between pixels within a certain distance, it is difficult to reduce a pixel size.

Another type of liquid crystal display is an FLCD (ferroelectric liquid crystal display). The FLCD utilizes the interaction between the spontaneous polarization of ferroelectric liquid crystal and an electric field, and provides a rapid response property of 1 ms or below to display moving pictures without any difficulty. An FLCD also provides a wide visual angle. The pixel size, in which cross-talk between pixels does not occur, can be reduced due to the strong interaction between molecules in an FLCD, so that high resolution display can be achieved. Because of the advantages described above, the field of FLCD has been researched extensively as a next-generation display device.

One widely used ferroelectric liquid crystal material is a chiral smectic C-phase (SmC*) liquid crystal material having a bi-stable property and a chevron structure.

In a fabricating process of the FLCD device using the liquid crystal material described above, the liquid crystal material is injected into a cell between substrates, while being maintained at a desired temperature, which is higher than the melting point of the liquid crystal material. Then, when the temperature is lowered, the liquid crystal material of chiral smectic C-phase (SmC*) is transformed to a chiral nematic phase (N*), and then to a smectic A-phase having a layer structure perpendicular to a rubbing direction, and then transformed back to the chiral smectic C-phase.

In this process, a long-axis direction of a liquid crystal molecule in a liquid crystal layer is tilted to a desired angle relative to the rubbing direction, thereby reducing the space between smectic layers. As a result, the smectic layer is bent in the liquid crystal layer in order to compensate for a change in volume. The bent layer structure is called the chevron structure, which has defined domains, each having a different long-axis direction according to the bending direction. On a boundary surface between the domains, there is formed a non-uniform orientation having a zigzag defect, a hair-pin defect, and a mountain defect.

Due to the non-uniform orientation property described above, a contrast ratio is remarkably lowered. If a DC voltage is applied to prevent the lowering of the contrast ratio, ions within the liquid crystal layer are accumulated on or adsorbed into a surface of an alignment film. Therefore, problems like afterimage effect occur. That is, the previous display pattern is dimly displayed on a current display pattern, when a previous display state is changed to the current display state.

Further, a ferroelectric liquid crystal material for providing an AFLC (anti ferroelectric liquid crystal) mode, in which the threshold limit is reduced, is actively being researched. However, since this ferroelectric liquid crystal material has a spontaneous polarization value of 100 nC/cm$^2$ in AFLC mode, the ions in the crystal are moved due to a depolarization field, and thus an afterimage can be generated. Also, if an active matrix driving method, in which the liquid crystal is independently driven in each pixel using a TFT (thin film transistor), is applied, leakage current can be generated by the large spontaneous polarization value. In order to restrict the leakage current, a capacitance has to be increased. However, in this case, since an aperture ratio is reduced, it is difficult to use it as a display device.

Meanwhile, the ferroelectric liquid crystal material having a bookshelf structure, in which AC driving is possible and the afterimage is restricted, has been steadily investigated. However, since the ferroelectric liquid crystal crystallized by a drop in temperature displays black at a negative potential and displays white at a positive potential, when the AC driving is performed to prevent the afterimage, luminance is reduced to a half. Further, when applying the negative potential, black is not perfectly displayed due to a leakage light.

SUMMARY OF THE INVENTION

It is, therefore, an object of the present invention to provide a method of fabricating a ferroelectric liquid crystal display, which has high contrast, high resolution, and a symmetrical displaying characteristic with respect to an applied negative/positive potential.

In accordance with one aspect of the present invention, there is provided a method of fabricating an FLCD, comprising steps of: forming a lower structure and an upper structure, each having a structure in which a substrate, an electrode layer and an alignment film are sequentially formed; forming a cell for injecting liquid crystal on one of the lower and upper structures; bonding the lower and upper structures to each other; injecting ferroelectric liquid crystal through the cell formed between the lower and upper structures and then sealing the cell; and applying an AC potential of a desired frequency to the electrode layer, while dropping a temperature of the ferroelectric liquid crystal so that a phase of the ferroelectric liquid crystal is transformed corresponding to a bookshelf structure.

In one embodiment, the material of the ferroelectric liquid crystal has a property, by which the phase of the ferroelectric liquid crystal is transformed from a chiral nematic phase into a chiral smectic C-phase while dropping a temperature of the ferroelectric liquid crystal.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

The preferred embodiments of the present invention will now be described with reference to the drawings.

Figure 1:
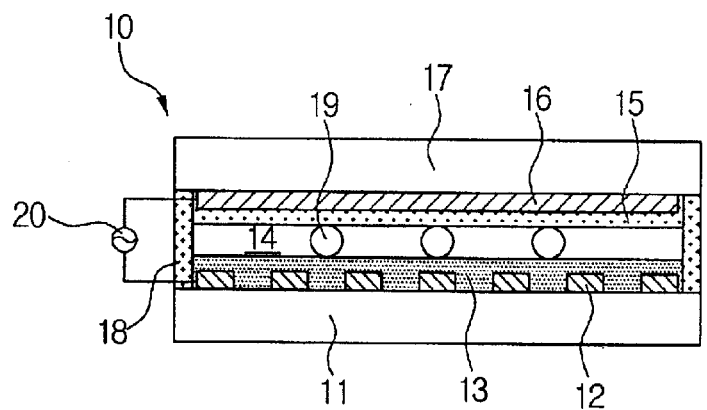
FIG. 1 is a cross-sectional view of a ferroelectric liquid crystal display device according to the present invention.

FIG. 1 is a cross-sectional view of a ferroelectric liquid crystal display device according to the present invention.

Referring to FIG. 1, an FLCD (ferroelectric liquid crystal display) device 10 includes a lower substrate 11, a lower electrode layer 12, a lower alignment film 13, a liquid crystal layer 14, an upper alignment film 15, an upper electrode layer 16, an upper substrate 17, a sealing member 18, and a spacer 19. Polarizers (not shown) are respectively disposed at a lower side of the lower substrate 11 and an upper side of the upper substrate 17 so that polarizing axes cross each other at a desired angle. A reference numeral 20 designates an AC driving source for applying an AC potential of a desired frequency during a crystallization process of ferroelectric liquid crystal injected into the liquid crystal layer 14.

The lower and upper substrates 11 and 17 are formed of a transparent material such as glass, transparent synthetic resin, etc.

The lower and upper electrode layers 12 and 16 are formed of a well-known transparent electric conduction material like an Indium Tin Oxide (ITO) material. Preferably, the lower and upper electrode layers 12 and 16 are respectively provided with a plurality of electrodes disposed side by side in a direction orthogonal to each other.

The lower and upper alignment films 13 and 15 are formed of various well-known aligning materials, e.g., polyimide, polyvinyl alcohol, nylon, PVA series, etc.

The lower and upper alignment films 13 and 15 are rubbing-processed at a desired angle by a rubbing material like cloth.

The spacer 19 is disposed to constantly maintain a gap of the liquid crystal layer 14.

The liquid crystal layer 14 is filled with a ferroelectric liquid crystal material having a micro-domain and a bookshelf structure formed by the crystallization process according to the present invention.

In the ferroelectric liquid crystal layer 14 having the bookshelf structure and the micro-domain, liquid crystal molecules in a smectic layer perpendicularly oriented on the micro-domain, which is minutely divided by the crystallization process, are aligned side by side in a row. In the FLCD device having the micro-domain of the bookshelf structure, as described above, the corresponding liquid crystal is injected in a melted state. If the AC potential is applied during a drop of temperature, a phase is transformed from a chiral nematic phase (N*) into a chiral smectic C-phase (SmC*), thereby obtaining a composition of a desired structure.

The liquid crystal material having the bookshelf structure, of which the phase is transformed from the chiral nematic phase (N*) into the chiral smectic C-phase (SmC*), are described in various documents, including Japanese Patent Laid-Open Publication Nos. 6-122875, 6-25060, 6-40985, 6-228057, U.S. Pat. No. 4,585,575 and Korean Patent Laid-Open Publication No. 1997-1332.

Figure 2:
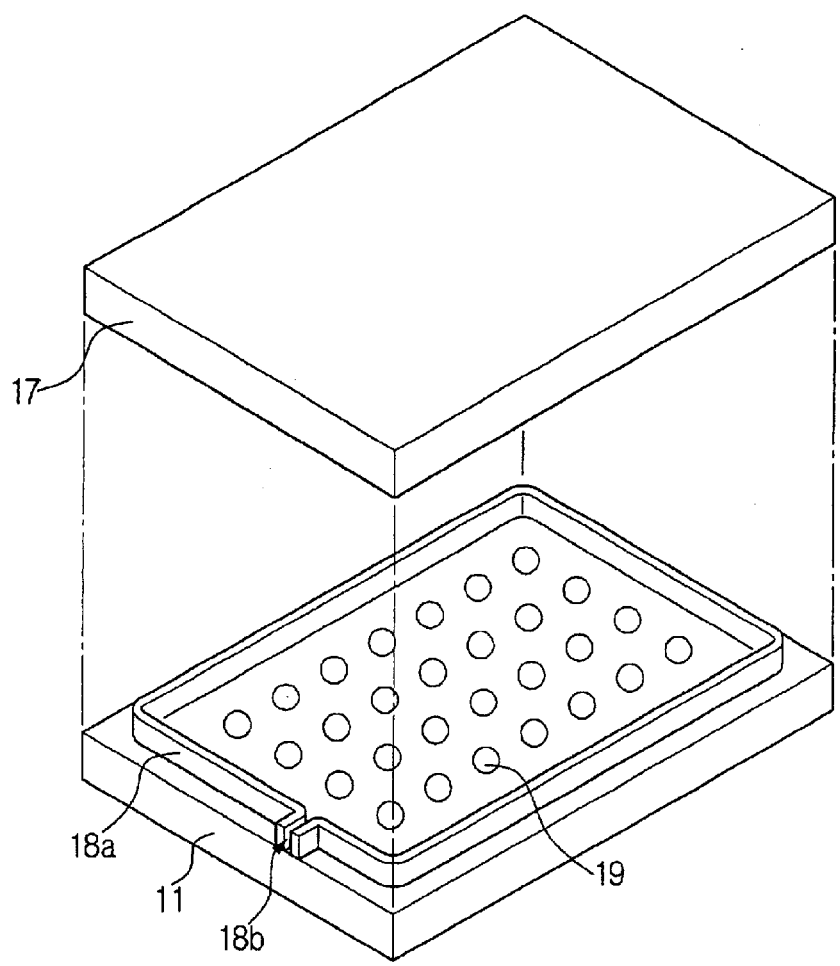
FIG. 2 is a perspective view showing a process of forming a cell for injecting liquid crystal on a substrate of the liquid crystal display device of FIG. 1.
Figure 3:
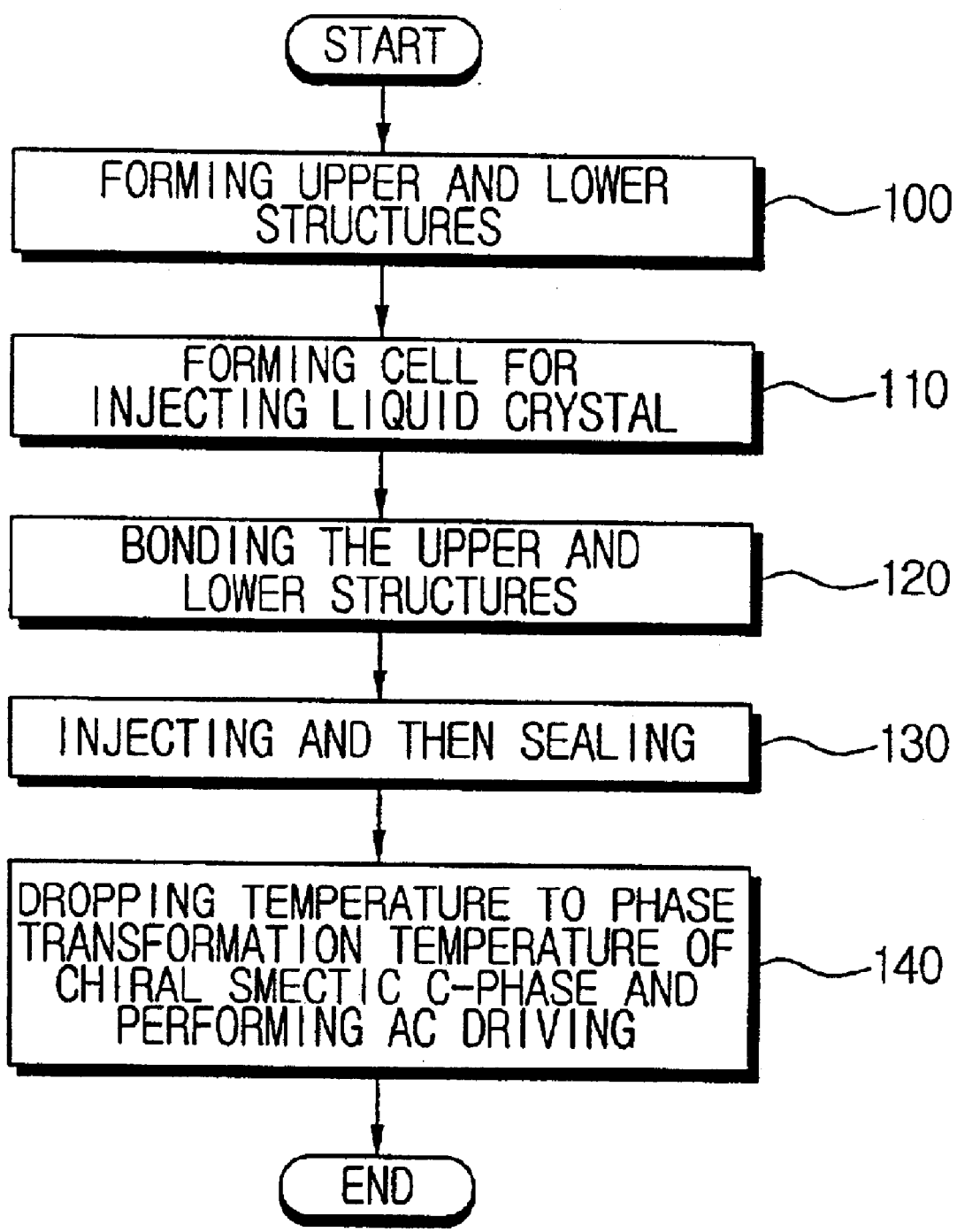
FIG. 3 is a flow chart showing a fabricating process of the ferroelectric liquid crystal display device according to the present invention.

Hereinafter, a fabricating method of the FLCD device according to the present invention will be described with reference to FIGS. 1–3.

First, an upper structure and a lower structure are formed (step 100).

In the lower structure, the lower substrate 11, the lower electrode layer 12 and the lower alignment film 13 are sequentially formed. In the upper structure, the upper substrate 17, the upper electrode layer 16 and the upper alignment film 15 are sequentially formed. The lower and upper alignment films 13 and 15 are respectively rubbing-processed in a predetermined direction by a rubbing member like a roller wrapped with cloth.

Sequentially, on the substrates 11 and 17 of one of the rubbing-processed lower and upper structures, a cell 18 having a desired pattern is formed of a sealing material like sealant (step 110). That is, as shown in FIG. 2, the cell 18 made of the sealing material 18a is formed to have an injecting port 18b on the lower substrate 11. Further, the spacer 19 for maintaining a cell gap is disposed between the upper and lower substrates 17 and 11.

Then, the lower and upper structures are bonded to each other (step 120).

After the bonding process, the ferroelectric liquid crystal, of which the phase is transformed from the chiral nematic phase (N*) into the chiral smectic C-phase (SmC*), is injected through the injecting port 18b of the cell 18 in an isotropically melted state, and then the injecting port 18b of the cell 18 is sealed (step 130).

Then, the crystallization process is performed to obtain the chiral smectic phase having the micro-domain and the bookshelf structure (step 140).

In the crystallization process, the temperature of the liquid crystal heated at a melting temperature or more and injected through the injecting port 18b of the cell is dropped, so that the phase is directly transformed through the chiral nematic phase (N*) into the chiral smectic C-phase (SmC*). At this time, the AC potential is applied to the lower and upper electrode layers 12 and 16 via the AC driving source 20.

The AC potential is applied when dropping the temperature of the liquid crystal, or applied at a temperature of the liquid crystal, which is a few to a few tens times higher than a phase transformation temperature into the chiral smectic C-phase (SmC*).

The liquid crystal display device fabricated by the crystallization process, as described above, has the liquid crystal layer 14 having the bookshelf structure and the micro-domain.

Hereinafter, the liquid crystal display device fabricated by the fabricating method according to the present invention will be described in comparison with a liquid crystal display device fabricated by a conventional method.

First, there will be described a ferroelectric liquid crystal material, of which the phase is directly transformed through the chiral nematic phase (N*) into the chiral smectic C-phase (SmC*), which is crystallized by only a cooling process according to a conventional method.

Figure 4:
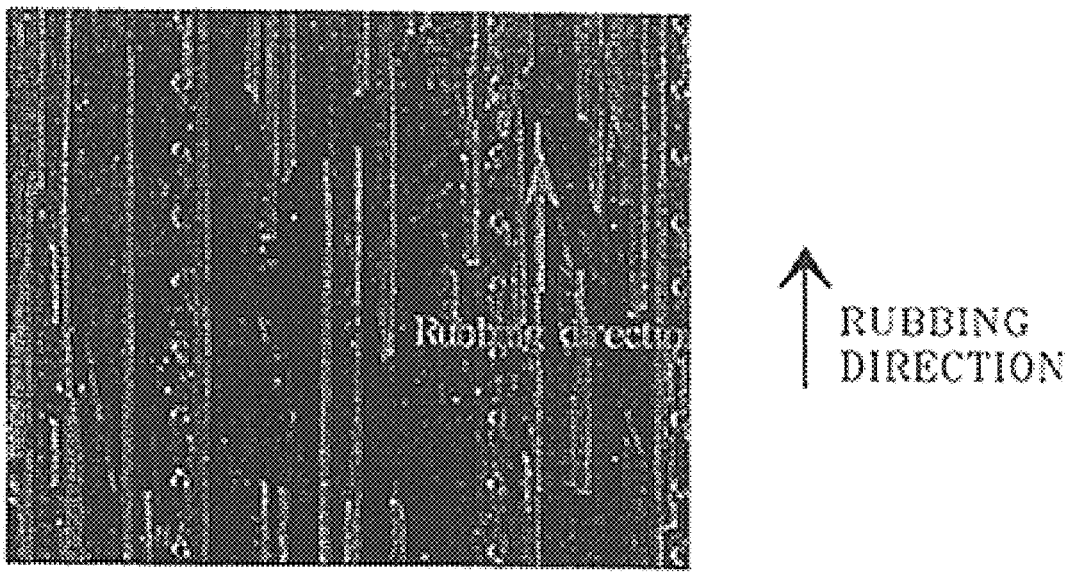
FIG. 4 is a photograph showing a display state of a liquid crystal display device when a potential is not applied, wherein the liquid crystal display device is fabricated by dropping a temperature of ferroelectric liquid crystal in a conventional fabricating method, in which a phase is transformed from a chiral nematic phase (N*) into a chiral smectic C-phase.

FIG. 4 shows a display state of the ferroelectric liquid crystal material through two polarizers disposed at outer portions of the both substrates 11 and 17, so that the polarization axes cross each other, when the ferroelectric liquid crystal material is cooled below the phase transformation temperature (e.g., 64° C.) into the chiral smectic C-phase (SmC*) in such a manner that its temperature is dropped at a cooling rate of 1° C./min from an isotropic state.

As shown in FIG. 4, two domains of a light portion and a dark portion repeatedly appear at regular intervals in a displayed image. In each of the two kinds of domains, a normal direction of a chiral smectic layer has a certain positive or negative angle with respect to the rubbing direction. The small round portions in the drawing are spacers. In each domain, a direction of the liquid crystal molecule is the same as the rubbing direction. However, the domains are distinguished from each other as the light and dark portions through the polarizers, because the polarization axes of the two domains are not identical, due to biaxiality of the chiral smectic C-phase.

Figure 5:
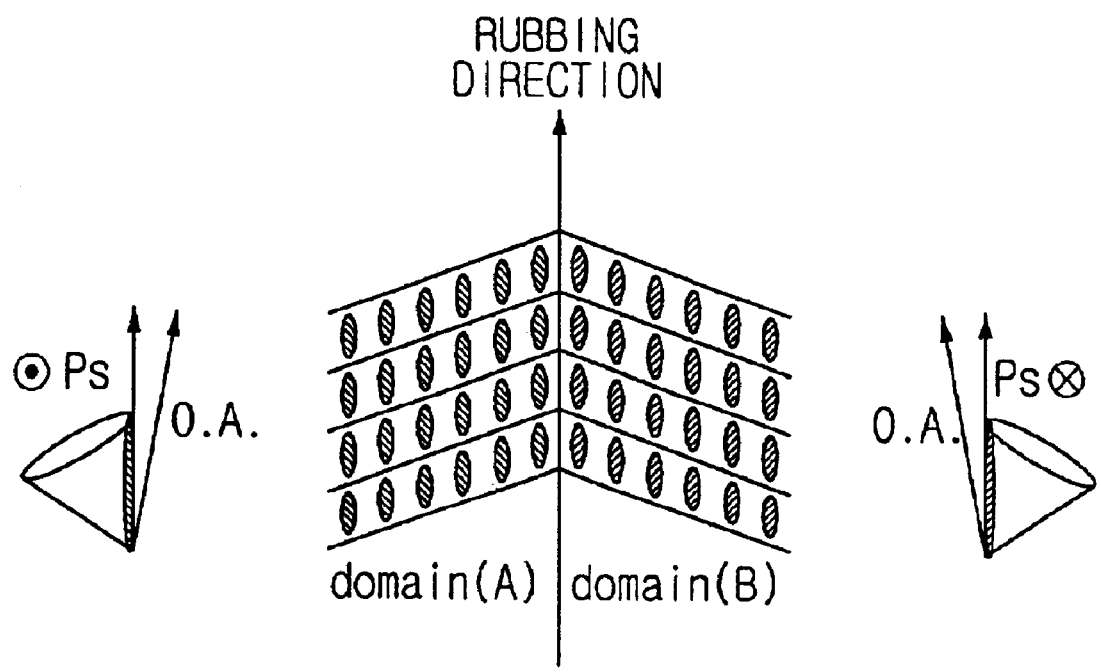
FIG. 5 is a schematic view showing an orientation state of the ferroelectric liquid crystal of FIG. 4.

Referring to FIG. 5, a direction of an optical axis (O.A.) is dislocated at an angle of 2–3° from the rubbing direction.

Each of the liquid crystal molecules is revolved along a track of a cone. The track of the cone in the domain A is inclined in a direction different from that of the track of the cone in the domain B. This is based on the condition that an axis of the cone has to be parallel with a normal direction of each layer. Further, in each of the domains A and B, the direction of the liquid crystal molecule is the same as the rubbing direction. However, a direction of the spontaneous polarization in the domain A is opposite to that of the spontaneous polarization in the domain B. Therefore, if a DC electric field is applied to the liquid crystal material having the aforementioned orientation structure, the domain having the spontaneous polarization parallel with the applied electric field becomes tighter, and thus can be aligned in a mono-domain state.

The displaying manner using the mono-domain described above is typically called an FLC CDR (continuous director rotation) mode. However, as described above, since the ferroelectric liquid crystal displays black at a negative potential and displays white at a positive potential, when the AC driving is performed to prevent the afterimage, luminance is reduced to a half. Further, when applying the negative potential, black is not perfectly displayed due to a leakage light.

Meanwhile, if the AC potential is applied during a drop in the temperature of the ferroelectric liquid crystal, the phase transformation is partially begun from a temperature of about 66° C., which is slightly higher than the phase transformation temperature (e.g., 64° C.) into the chiral smectic C-phase. The chiral nematic phase temporarily coexists with the chiral smectic C-phase, before the ferroelectric liquid crystal is completely transformed into the chiral smectic C-phase at a temperature of 64° C.

FIGS. 6A to 8F show an orientation state of the liquid crystal for a variety of values of cooling rate and voltage and frequency of the AC potential, which are applied from outside the liquid crystal when transforming the phase.

Figure 6A:
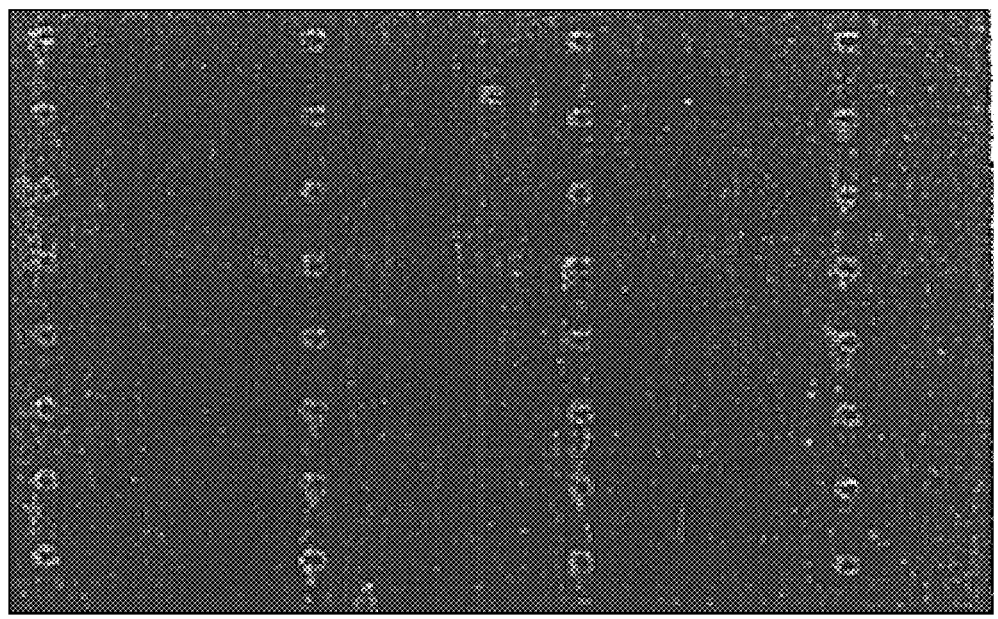
FIG. 6A is a photograph showing the display state of a liquid crystal display device fabricated by a fabricating process according to the present invention, when the potential is not applied.

FIG. 6A is a photograph of the display state of the liquid crystal through the polarizer at a temperature of 40° C., which is lower than the phase transformation temperature into the chiral smectic phase, wherein the liquid crystal is aligned by applying the cooling rate of 1° C./min and the AC potential of 5V at a frequency of 400 Hz.

Figure 6B:
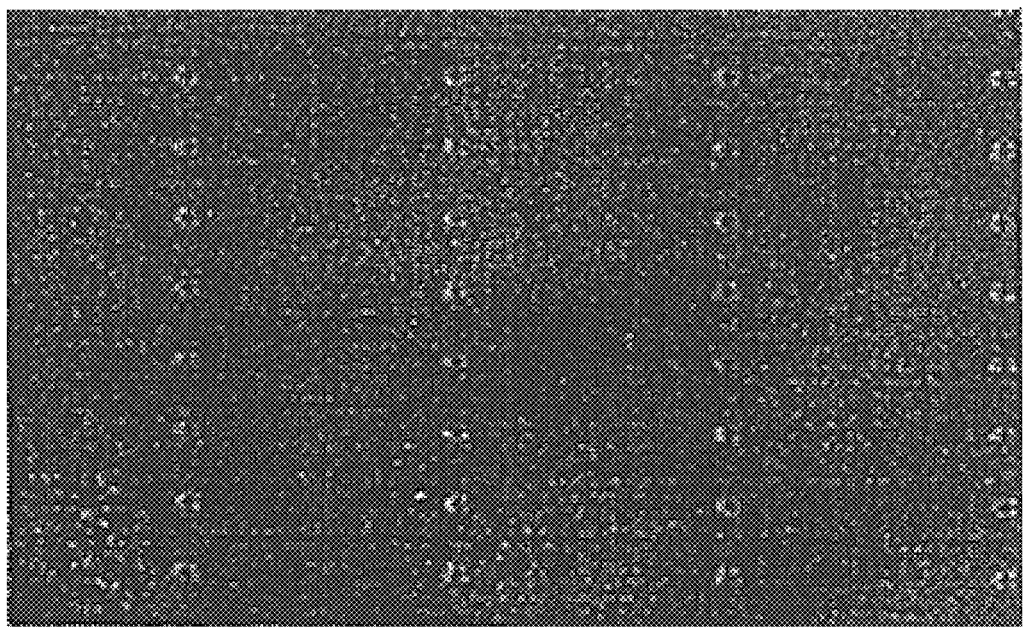
FIG. 6B is a photograph showing the display state at a temperature of 70° C., in which a phase transformation is not yet performed from the chiral nematic phase (N*) into the chiral smectic C-phase, in the fabricating process according to the present invention.

As shown in FIGS. 6A and 6B, the two domains shown in FIG. 4 disappear, and are aligned in a clear black mono-domain. For reference, FIG. 6B is a photograph showing the display state of the chiral nematic phase at a temperature of 70° C., which is higher than the phase transformation temperature into the chiral smectic C-phase, while applying the AC potential. FIG. 6B shows a slightly lighter black than FIG. 6A.

Figure 7A:
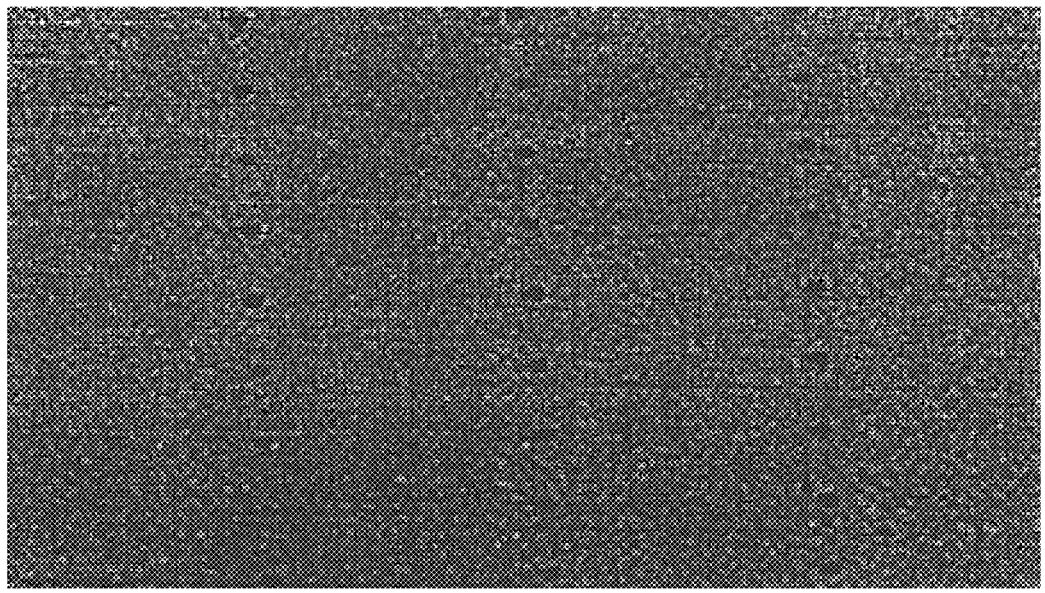
FIG. 7A is a photograph showing the display state of the liquid crystal display device fabricated by a fabricating process according to the present invention, when a positive potential is applied.
Figure 7B:
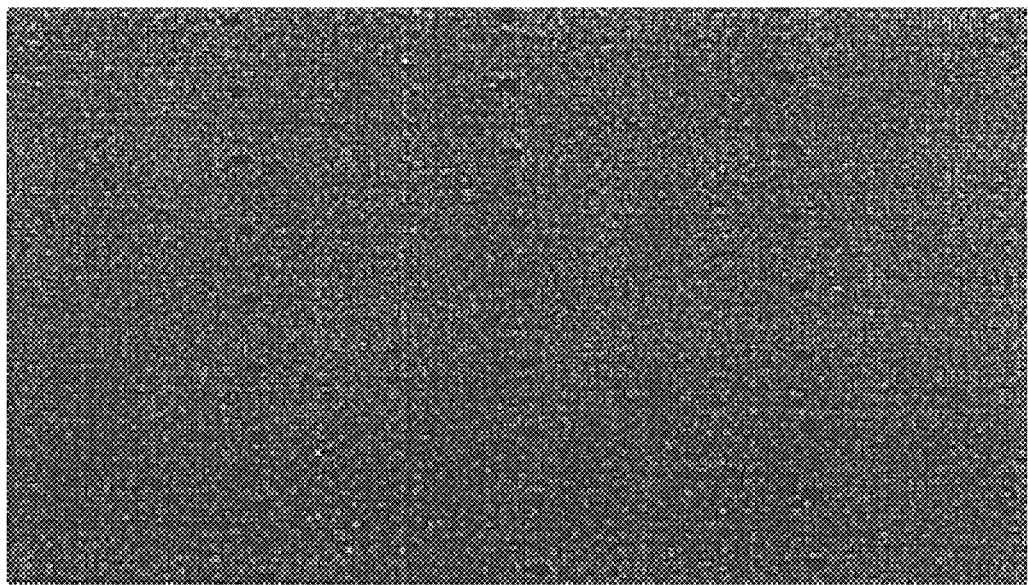
FIG. 7B is a photograph showing the display state of the liquid crystal display device fabricated by the fabricating process according to the present invention, when a negative potential is applied.

In order to examine an action during the crystallization process in the case that the phase transformation is performed while applying the AC potential, as described above, FIGS. 7A and 7B each show a white state of the liquid crystal when a voltage of +5V or −5V, respectively, is applied at a temperature of 40° C. to the liquid crystal in which the phase transformation is completed. As shown in FIGS. 7A and 7B, the symmetrical white states can be obtained at the negative and positive potential corresponding to the black states, in the case that the potential is not applied. That is, the preferable liquid crystal structure having a V-shaped curve for applied positive or negative potential versus transmittance is provided.

Meanwhile, in order to examine an action during the crystallization process in the case that the applied potential and the frequency are varied, the frequency is varied in a state that the cooling rate (1° C./min) and the applied AC potential (5V) are the same as in the aforementioned example.

FIGS. 8A to 8F show the display states of the liquid crystal obtained through the polarizer at a temperature of 40° C., wherein the liquid crystal is crystallized by applying the AC potential of 5V at each frequency of 1 Hz, 100 Hz, 200 Hz, 300 Hz, 400 Hz, and 500 Hz.

Figure 8A:
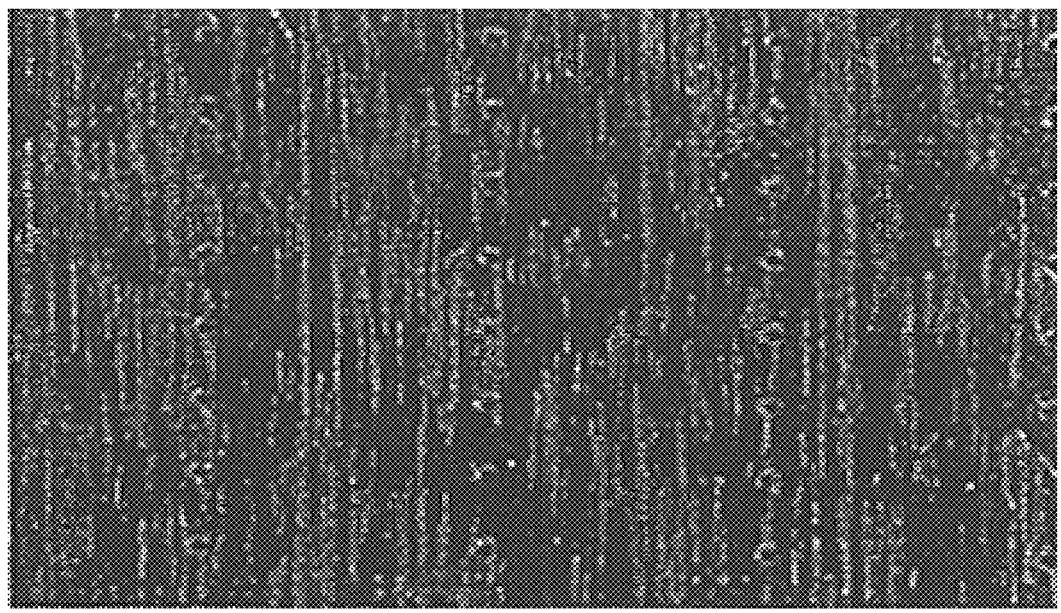
FIGS. 8A to 8F are photographs showing the display state of each liquid crystal display device fabricated by applying various frequencies of the applied AC potential during a drop of temperature.
Figure 8B:
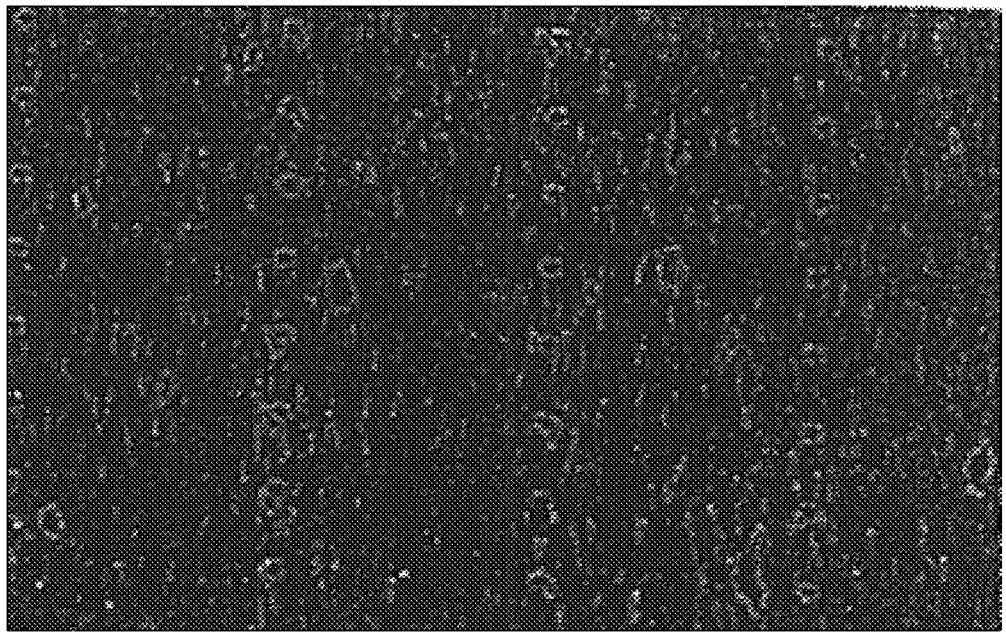
Figure 8C:
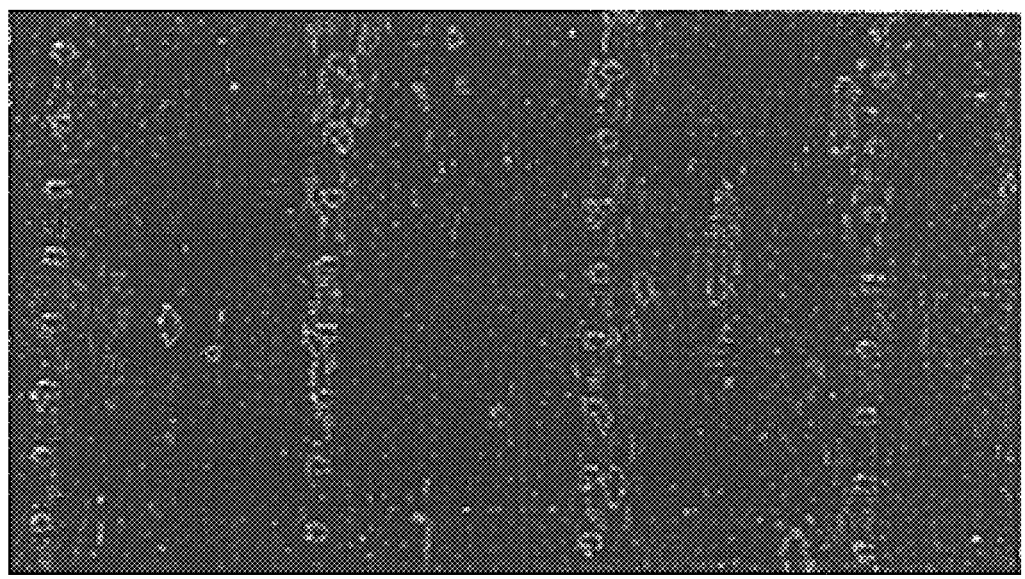
Figure 8D:
Figure 8E:
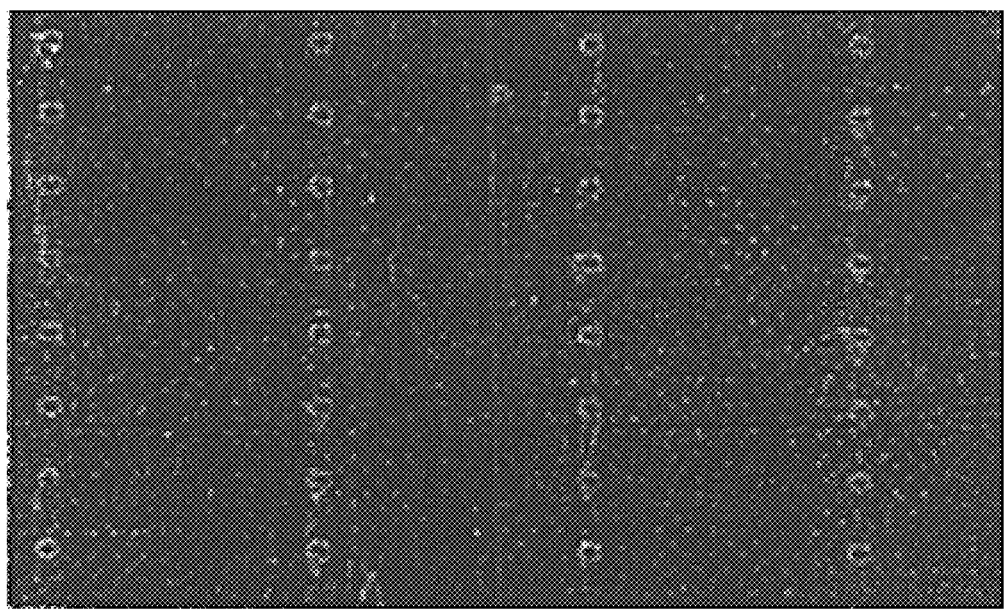

As shown in the drawings, the higher the frequency of the AC potential, the narrower the gap between the disparate domains of FIG. 4. When applying the AC potential of the frequency of 400 Hz, as shown in FIG. 8E, the clearest black state can be obtained.

Therefore, it can be appreciated that the distance between the two domains becomes smaller, based on an increase in the frequency of the applied AC potential. As a result, it appears that the gap between the two domains disappears.

Since the gaps between the spacers in the figures are 300 μm and 100 μm, it is appreciated that the domain is formed in a micro unit in which the space of the domain is very limited.

This will be described fully with reference to FIGS. 9A to 9C.

Figure 9A:
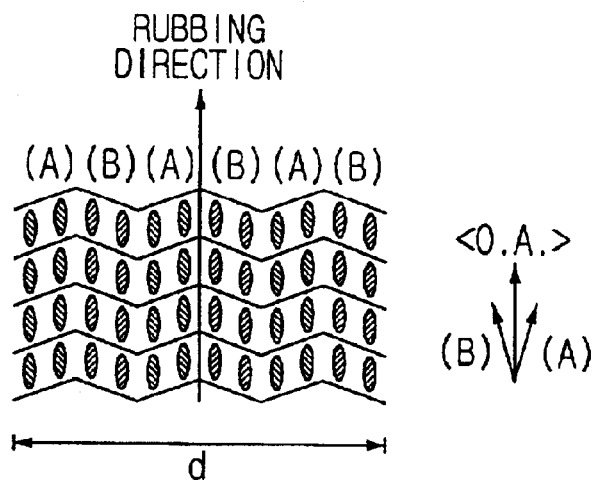
FIG. 9A is a schematic view of the orientation state of the liquid crystal to show the display state of the liquid crystal display device fabricated by the fabricating process according to the present invention, when the potential is not applied.
Figure 9B:
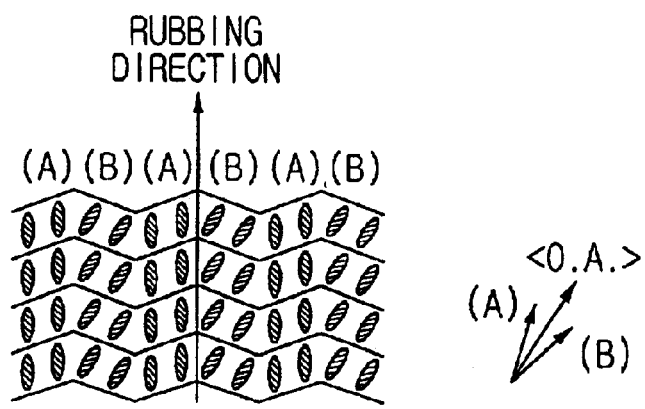
FIG. 9B is a schematic view of the orientation state of the liquid crystal to show the display state of the liquid crystal display device fabricated by the fabricating process according to the present invention, when the positive potential is applied.
Figure 9C:
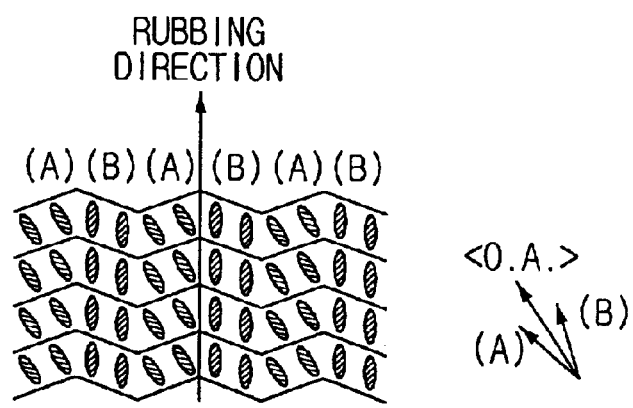
FIG. 9C is a schematic view of the orientation state of the liquid crystal to show the display state of the liquid crystal display device fabricated by the fabricating process according to the present invention, when the negative potential is applied.
Figure 10A:
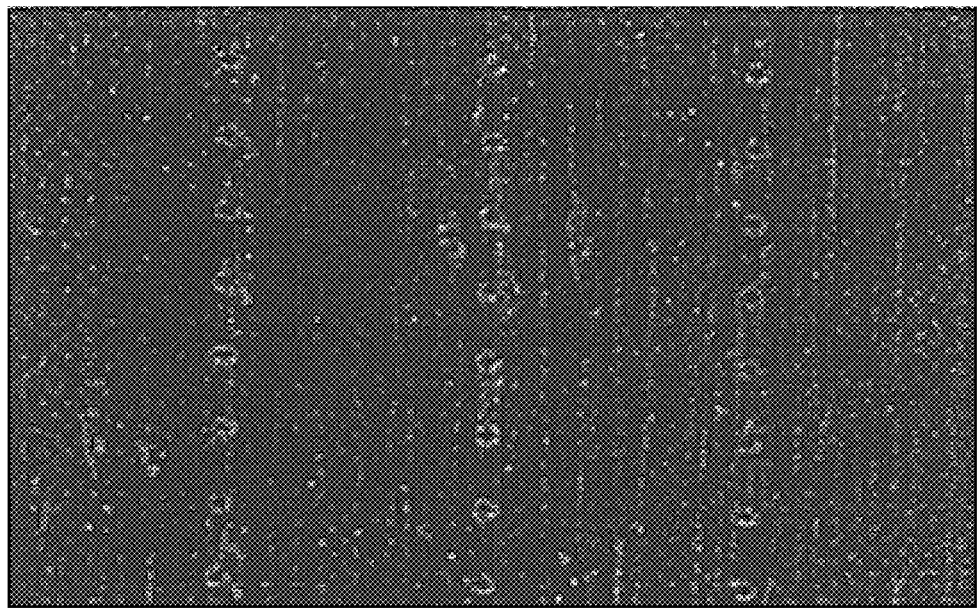
FIGS. 10A to 10D are photographs showing the display state of each liquid crystal display device fabricated by applying various AC voltages to the liquid crystal display during a drop of temperature.
Figure 10B:
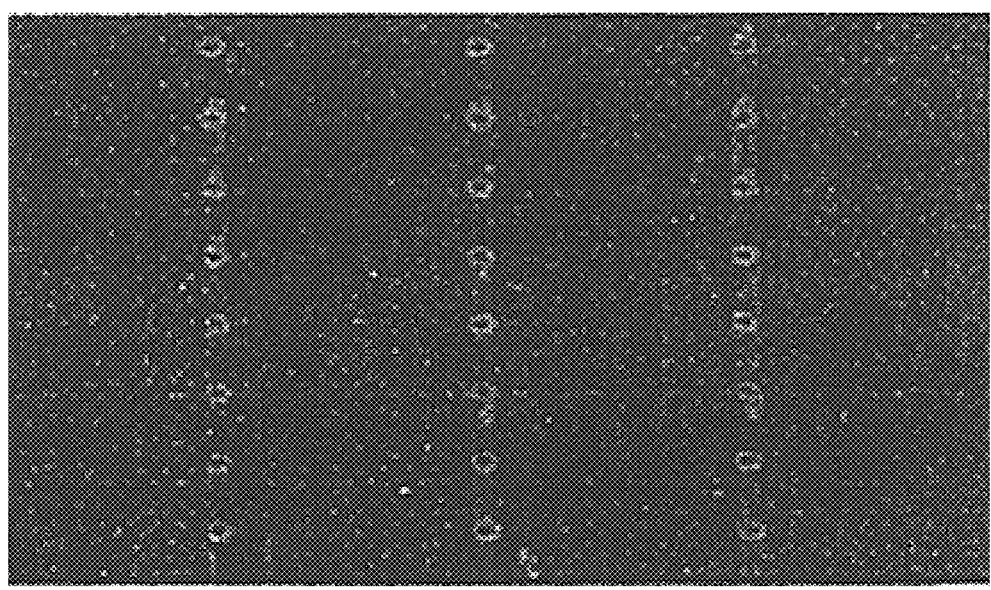
Figure 10C:
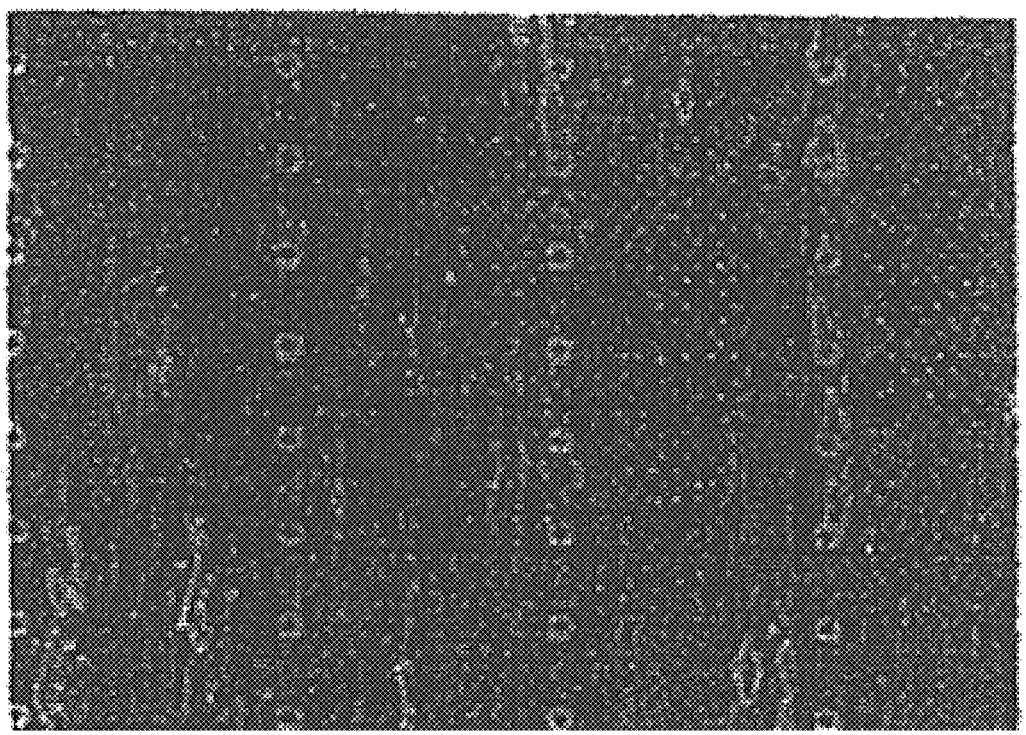
Figure 10D:
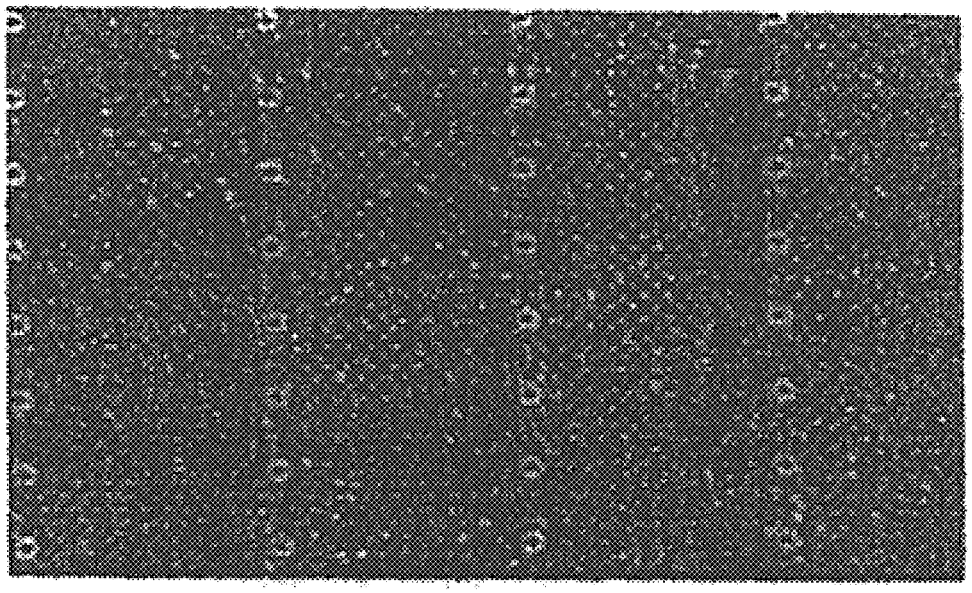

First, as shown in FIG. 9A, if the micro-domain is formed within a distance "d" of the resolution sensed by the human eye, since the average optical axis direction is the same as the rubbing direction, incident light is blocked between the polarizers. The polarizing axes of the polarizers cross each other at an angle of 90°, so that the display state becomes black. Further, if the voltage of +5 is applied, a domain B portion is switched. Therefore, as shown in FIG. 9B, the average optical axis is tilted, so that the light can be passed. Thus, the display state becomes white. In the same manner, if the voltage of −5 is applied, a domain A portion is switched. As shown in FIG. 9C, the average optical axis is tilted in an opposite direction to the tilted optical axis of domain B, so that the light can be passed Thus, the display state becomes white.

In this case, since the phase transformation from the chiral nematic phase to the chiral smectic C-phase is not instantaneously performed by the externally applied AC electric field, but slowly performed at a temperature in the range of 64–66° C., it is estimated that, a nucleation and growth process is selectively repeated in the domain A at a positive potential and in the domain B at a negative potential for a time of 1/2 f sec (herein, f is the frequency of the AC potential), e.g., 5 ms in the case that a frequency of 100 Hz is applied, and thus the micro-domain is formed.

Therefore, if the frequency of the applied electric field is increased, the time for growing each domain is reduced. Therefore, the domain cannot be sufficiently grown. Further, the micro-domain can be minutely formed.

Figure 8F:
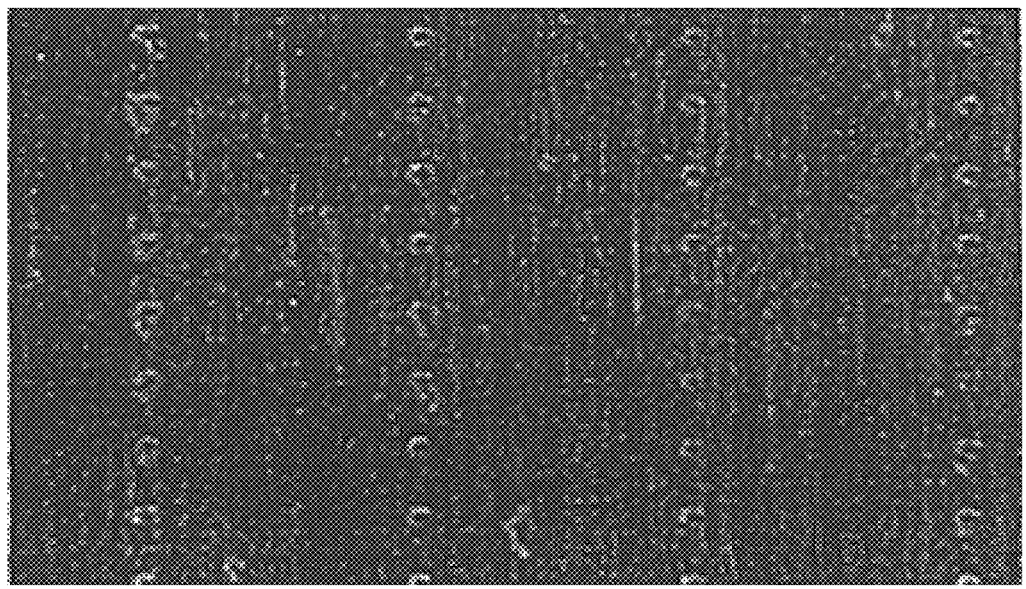

However, if the frequency of the applied AC potential exceeds the relaxation frequency of the ferroelectric liquid crystal, the liquid crystal molecule cannot properly react. Thus, the micro-domain is not formed, as shown in FIG. 8F.

Therefore, it is preferable that the frequency of the applied AC voltage is decided according to a reaction characteristic of the applied ferroelectric liquid crystal.

Meanwhile, FIGS. 10A to 10D show the display states of the liquid crystal in the case that the frequency of the applied electric field is 400 Hz and an applied voltage is 3V, 5V, 10V and 20V, respectively.

As shown in FIGS. 10A to 10D, when applying a voltage of 3V, since the spontaneous polarization of the liquid crystal molecule is not sufficiently performed, the space of the domain is wider than that of the domain when applying a voltage of 5V. Further, when applying a voltage of 10V, although the micro-domain is formed, a loop defect is generated. And when applying a voltage of 20V, a dot defect is generated. On the basis of the defects, it is estimated that layer distortion is caused by the applied electric field.

Therefore, it is preferable that the applied AC potential is determined within a range in which the layer distortion does not occur and the spontaneous polarization is sufficiently performed.

Figure 11:
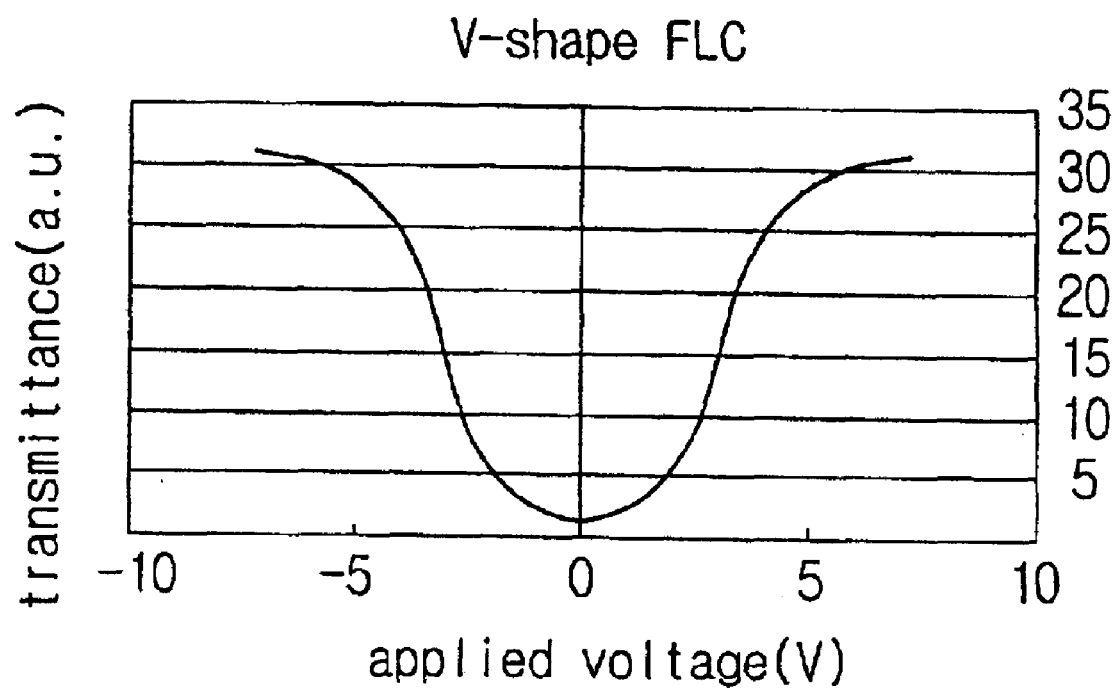
FIG. 11 is a graph showing a transmittance with respect to the applied potential of the ferroelectric liquid crystal display device fabricated by the fabricating process according to the present invention.

FIG. 11 is a graph showing a relationship between the applied voltage and the transmittance in the liquid crystal device formed by applying a voltage of 5V, a frequency of 400 Hz, and a cooling rate of 1° C./min. As shown in FIG. 11, the transmittance has the V-shaped characteristic with respect to the positive and negative potential.

As described above, in the ferroelectric liquid crystal device according to the present invention, it is possible to perform the AC driving by the liquid crystal layer having the micro-domain of the bookshelf structure. Also, the ferroelectric liquid crystal device according to the present invention provides a wider visual angle and the clear white and black state.

While the invention has been shown and described with reference to the preferred embodiments thereof, it will be understood by those skilled in the art that various changes in form and details may be made therein without departing from the sprit and scope of the invention as defined by the appended claims.

What is claimed is:

1. A method of fabricating a ferroelectric liquid crystal display, comprising steps of:

forming a lower structure and an upper structure, each having a substrate, an electrode layer, and an alignment film;

forming a cell between the lower and upper structures;

injecting ferroelectric liquid crystal into the cell and then sealing the cell; and applying an AC potential of a desired frequency to the electrode layers, while dropping a temperature of the ferroelectric liquid crystal so that a phase of the ferroelectric liquid crystal is transformed by a ferroelectric effect to correspond to a bookshelf structure.

2. The method of claim 1, wherein a material of the ferroelectric liquid crystal has a property by which the phase of the ferroelectric liquid crystal is transformed from a chiral nematic phase into a chiral smectic C-phase while dropping the temperature of the ferroelectric liquid crystal.

3. The method of claim 1, wherein the substrate, the electrode layer, and the alignment film of each of the lower and upper structures are sequentially formed.

4. A method of fabricating a ferroelectric liquid crystal display, comprising steps of:

forming a lower structure and an upper structure, each having a substrate, an electrode layer, and an alignment film which are sequentially formed;

forming a cell for injecting liquid crystal on one of the lower and upper structures;

bonding the lower and upper structures together;

injecting ferroelectric liquid crystal through the cell formed between the lower and upper structures and then sealing the cell; and applying an AC potential of a desired frequency to the electrode layer, while dropping a temperature of the ferroelectric liquid crystal so that a phase the ferroelectric liquid crystal is transformed by a ferroelectric effect corresponding to a bookshelf structure.

* * * * *